US012757028B2

(12) United States Patent
Xing et al.

(10) Patent No.: US 12,757,028 B2
(45) Date of Patent: Oct. 6, 2026

(54) NETWORK RESOURCE MANAGEMENT METHOD AND COMMUNICATION APPARATUS

(71) Applicant: HUAWEI TECHNOLOGIES CO., LTD., Shenzhen (CN)

(72) Inventors: Weijun Xing, Shanghai (CN); Shaoyun Wu, Shanghai (CN); Yang Wang, Shenzhen (CN); Xueqiang Yan, Shanghai (CN); Mingyu Zhao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 183 days.

(21) Appl. No.: 18/755,983

(22) Filed: Jun. 27, 2024

(65) Prior Publication Data

US 2024/0349062 A1 Oct. 17, 2024

Related U.S. Application Data

(63) Continuation of application No. PCT/CN2022/140712, filed on Dec. 21, 2022.

(30) Foreign Application Priority Data

Dec. 31, 2021 (CN) ......................... 202111679655.2

(51) Int. Cl.

*H04W 12/041* (2021.01)
*H04W 4/50* (2018.01)
*H04W 12/72* (2021.01)

(52) U.S. Cl.

CPC ............. *H04W 12/72* (2021.01); *H04W 4/50* (2018.02)

(58) Field of Classification Search

CPC ....... H04W 8/20; H04W 8/186; H04W 12/72; H04W 4/50; H04W 28/0925; H04W 28/06; H04W 72/1265; H04L 41/142; H04L 41/147

See application file for complete search history.

(56) References Cited

U.S. PATENT DOCUMENTS

| | | | | |
|---|---|---|---|---|
| 2022/0312512 | A1* | 9/2022 | Li | H04W 76/12 |
| 2022/0360977 | A1* | 11/2022 | Kim | H04W 8/08 |
| 2022/0377702 | A1* | 11/2022 | Chun | H04W 76/30 |
| 2024/0172097 | A1* | 5/2024 | Fu | H04W 8/005 |

FOREIGN PATENT DOCUMENTS

| | | |
|---|---|---|
| CN | 105704762 A | 6/2016 |
| CN | 110505627 A | 11/2019 |

* cited by examiner

*Primary Examiner* — Phuoc H Doan

(74) *Attorney, Agent, or Firm* — Rimon PC

(57) ABSTRACT

This application provides a network resource management method and a communication apparatus. The network resource management method includes: a first network element receives a first message from a second network element. The first message carries an identifier of a first terminal device, and the first message is used to request to create or select a first user service node corresponding to the first terminal device. Further, the first network element creates or selects the first user service node based on the identifier of the first terminal device, where the first user service node is configured to provide a network service for the first terminal device.

20 Claims, 4 Drawing Sheets

NETWORK RESOURCE MANAGEMENT METHOD AND COMMUNICATION APPARATUS

CROSS-REFERENCE TO RELATED APPLICATIONS

This application is a continuation of International Application No. PCT/CN2022/140712, filed on Dec. 21, 2022, which claims priority to Chinese Patent Application No. 202111679655.2, filed on Dec. 31, 2021. The disclosures of the aforementioned applications are hereby incorporated by reference in their entireties.

TECHNICAL FIELD

This application relates to the field of communication technologies, and in particular, to a network resource management method and a communication apparatus.

BACKGROUND

In a 5th generation (5G) communication system, there are a plurality of different network elements (network functions, NFs) in a core network. Each network element performs a different function, and each network element provides a corresponding service for user equipment (UE) based on logic. For example, an access and mobility management function (AMF) may provide services for UEs connected to a same base station (geographical location-related), and a session management function (SMF) may distinguish between services based on a data network name (DNN) corresponding to a UE session. It may be understood that a core network architecture of a 5G network is designed based on network logic.

To enable the network to better serve users, the network architecture is expected to be centered on user requirements. Fine-grained function division needs to be performed on the network element functions in the network architecture from a perspective of a user terminal, while ensuring function integrity of the network structure. However, after fine-grained division of the network element functions, how to manage network resources of the users is an urgent problem to be resolved.

SUMMARY

Embodiments of this application provide a network resource management method and a communication apparatus. According to the network resource management method, network resources of a user can be managed after fine-grained function division is performed on network element functions in a network architecture from a perspective of a user terminal.

According to a first aspect, an embodiment of this application provides a network resource management method. In the method, a first network element receives a first message from a second network element, where the first message carries an identifier of a first terminal device, and the first message is used to request to create or select a first user service node corresponding to the first terminal device. Further, the first network element creates or selects the first user service node based on the identifier of the first terminal device, where the first user service node is configured to provide a network service for the first terminal device.

According to the method described in the first aspect, the first network element may flexibly create or select, based on a requirement of a terminal device, a user service node that serves the terminal device, to improve flexibility of user resource creation.

In a possible implementation, the first network element obtains subscription information or policy information of the first terminal device from a third network element based on the identifier of the first terminal device, where the third network element includes the subscription information or the policy information corresponding to the first terminal device. Further, the first network element creates or selects the first user service node based on the subscription information or the policy information of the first terminal device, where a network capability of the first user service node matches the subscription information or the policy information of the first terminal device. According to the possible implementation, the first network element creates or selects, based on the subscription information or the policy information of the terminal device, the user service node that serves the terminal device, to improve adaptability between the user service node and the terminal device.

In a possible implementation, the first network element sends first information of the first user service node to the second network element, where the first information includes one or more of an identifier of the first user service node, address information of the first user service node, status information of the first user service node, or the network capability of the first user service node. According to the possible implementation, the second network element may be connected to the first user service node, and then service request information of the terminal device is directly sent to the user service node corresponding to the terminal device, to simplify the service request process of the terminal device and save communication resources.

In a possible implementation, the first network element sends second information of the first user service node to the third network element, where the second information includes the identifier of the user service node and/or the address information of the user service node. In this way, the terminal device can be bound to the user service node corresponding to the terminal device in a data network element (namely, the third network element).

In a possible implementation, the first message further includes information about an access network device; the information about the access network device includes an identifier of the access network device and/or address information of the access network device; and there is a communication connection between the access network device and the first terminal device. Further, the first network element sends the information about the access network device to the first user service node. In this way, the first user service node may be connected to the access network device, and subsequently, the access network device may directly send the service request information of the terminal device to the user service node corresponding to the terminal device, to simplify the service request process of the terminal device and save communication resources.

In a possible implementation, the first message is one of a non-access stratum message, a registration request message, a service request message, a session establishment message, or a user service node creation request message.

According to a second aspect, an embodiment of this application provides another network resource management method. In the method, a first network element receives a second message, where the second message is used to update a second user service node. Further, the first network element updates the second user service node based on the second message. The first network element sends first information of an updated second user service node to a second network element, where the first information includes one or more of an identifier of the updated second user service node, address information of the updated second user service node, status information of the updated second user service node, or a network capability of the updated second user service node.

According to the method described in the second aspect, the first network element may flexibly update, based on an actual situation, a user service node that serves a terminal device, to improve adaptability between the user service node and the terminal device and improve flexibility of user resource creation.

In a possible implementation, the first network element sends second information of the updated second user service node to a third network element, where the second information includes the identifier of the updated second user service node and/or the address information of the updated second user service node, and the third network element includes subscription information or policy information corresponding to the second terminal device.

In a possible implementation, the second message is from the second user service node, the second message carries third information, the third information indicates that the second user service node receives no signaling corresponding to the second terminal device within first duration, and the second terminal device is a terminal device for which the second user service node provides a network service. The first network element releases or suspends a resource of the second user service node, or releases or suspends a resource that is in the second user service node and that is provided for the second terminal device. According to the possible implementation, the first network element may release or suspend a network resource that has not been allocated for a long time, perform dynamic management on network resources of users, save storage space, and improve management flexibility.

In a possible implementation, the second message is from the second user service node or the second network element; the second message carries fourth information, and the fourth information indicates that a network capability of an access network device does not match the network capability of the second user service node; there is a communication connection between the second user service node and the access network device, and there is a communication connection between the second network element and the access network device; and the fourth information includes the network capability of the access network device, and the identifier of the second user service node or the address information of the second user service node. The first network element modifies the network capability of the second user service node based on the network capability of the access network device. According to the possible implementation, the first network element performs dynamic adjustment on the network capability of the user service node, to adapt to an application scenario.

In a possible implementation, the second message is from the third network element, the third network element includes the subscription information or the policy information of the second terminal device, the second terminal device is a terminal device for which the second user service node provides a network service, the second message carries fifth information, and the fifth information indicates that the subscription information or the policy information of the second terminal device changes. Further, the first network element obtains changed subscription information or policy information of the second terminal device from the third network element; and updates the second user service node based on the changed subscription information or policy information. According to the possible implementation, the first network element updates the user service node synchronously based on a change of the subscription information or the policy information of the terminal device, to improve adaptability between the user service node and the terminal device.

In a possible implementation, the first network element is a user service node configured by a network service node, or the first network element is a network element other than a network service node.

In a possible implementation, the second network element is one of a network service node, an access and mobility management function (AMF) network element, or a network service network element.

In a possible implementation, the user service node is a user service function entity or a user service logical resource.

According to a third aspect, an embodiment of this application further provides another network resource management method. In the method, a second network element sends a first message to a first network element, where the first message carries an identifier of a first terminal device, and the first message is used to request to create or select a first user service node corresponding to the first terminal device.

According to the method described in the third aspect, for beneficial effects of the method, refer to the beneficial effects of the method described in the first aspect. Details are not described herein again.

In a possible implementation, the second network element receives first information of the first user service node, where the first information of the first user service node is from the first network element or the first user service node; and the first information includes one or more of an identifier of the first user service node, address information of the first user service node, status information of the first user service node, or a network capability of the first user service node.

In a possible implementation, the first message further includes information about an access network device; the information about the access network device includes an identifier of the access network device and/or address information of the access network device; and there is a communication connection between the access network device and the first terminal device.

In a possible implementation, the second network element sends the information about the access network device to the first user service node.

In a possible implementation, the second network element sends the first information of the first user service node to the access network device.

In a possible implementation, the first message is one of a non-access stratum message, a registration request message, a service request message, a session establishment message, or a user service node creation request message.

According to a fourth aspect, an embodiment of this application provides another network resource management method. In the method, a second network element receives first information of an updated second user service node, where the first information of the updated second user service node is from a first network element or the second user service node; and the first information includes one or more of an identifier of the updated second user service node, address information of the updated second user service node, status information of the updated second user service node, or a network capability of the updated second user service node.

According to the method described in the fourth aspect, for beneficial effects of the method, refer to the beneficial effects of the method described in the second aspect. Details are not described herein again.

In a possible implementation, the second network element sends a second message to the first network element, where the second message is used to update the second user service node; the second message carries fourth information, and the fourth information indicates that a network capability of an access network device does not match the network capability of the second user service node; there is a communication connection between the second user service node and the access network device, and there is a communication connection between the second network element and the access network device; and the fourth information includes the network capability of the access network device, and the identifier of the second user service node or the address information of the second user service node.

In a possible implementation, the first network element is a user service node configured by a network service node, or the first network element is a network element other than a network service node.

In a possible implementation, the second network element is one of a network service node, an AMF network element, or a network service network element.

In a possible implementation, the user service node is a user service function entity or a user service logical resource.

According to a fifth aspect, this application provides a communication apparatus. The apparatus may be an apparatus in a first network element, or an apparatus that can be used in a matching manner with the first network element. The communication apparatus may alternatively be a chip system. The communication apparatus may perform the method according to the first aspect or the second aspect. A function of the communication apparatus may be implemented by hardware, or may be implemented by executing corresponding software by hardware. The hardware or the software includes one or more units corresponding to the foregoing function. The unit may be software and/or hardware. For operations performed by the communication apparatus and beneficial effects thereof, refer to the method according to the first aspect or the second aspect, and the beneficial effects thereof. Repeated content is not described again.

According to a sixth aspect, this application provides a communication apparatus. The apparatus may be an apparatus in a second network element, or an apparatus that can be used in a matching manner with the second network element. The communication apparatus may alternatively be a chip system. The communication apparatus may perform the method according to the second aspect. A function of the communication apparatus may be implemented by hardware, or may be implemented by executing corresponding software by hardware. The hardware or the software includes one or more units corresponding to the foregoing function. The unit may be software and/or hardware. For operations performed by the communication apparatus and beneficial effects thereof, refer to the method according to the third aspect or the fourth aspect, and the beneficial effects thereof. Repeated content is not described again.

According to a seventh aspect, this application provides a communication apparatus. The communication apparatus may be the first network element in the foregoing method embodiments, or may be a chip disposed in the first network element. The communication apparatus includes a communication interface and a processor, and optionally, further includes a memory. The memory is configured to store computer programs or instructions. The processor is coupled to the memory and the communication interface. When the processor executes the computer programs or instructions, the communication apparatus is enabled to perform the method performed by the first network element in the foregoing method embodiment.

According to an eighth aspect, this application provides a communication apparatus. The communication apparatus may be the second network element in the foregoing method embodiments, or may be a chip disposed in the second network element. The communication apparatus includes a communication interface and a processor, and optionally, further includes a memory. The memory is configured to store computer programs or instructions. The processor is coupled to the memory and the communication interface. When the processor executes the computer programs or instructions, the communication apparatus is enabled to perform the method performed by the second network element in the foregoing method embodiment.

According to a ninth aspect, this application provides a computer-readable storage medium. The computer-readable storage medium is configured to store computer-executable instructions, and when the computer executable instructions are executed, the method performed by the first network element in the method according to the first aspect or the second aspect is implemented, or the method performed by the second network element in the method according to the third aspect or the fourth aspect is implemented.

According to a tenth aspect, this application provides a computer program product including a computer program. When the computer program is executed, the method performed by the first network element in the method according to the first aspect or the second aspect is implemented, or the method performed by the second network element in the method according to the third aspect or the fourth aspect is implemented.

According to an eleventh aspect, this application provides a communication system. The communication system includes the communication apparatuses according to the fifth aspect and the sixth aspect, or includes the communication apparatuses according to the seventh aspect and the eighth aspect.

DESCRIPTION OF EMBODIMENTS

The following further describes embodiments of this application in detail with reference to accompanying drawings.

The terms "first", "second", and the like in the specification, claims, and accompanying drawings of this application are used to distinguish between different objects, but are not used to describe a specific sequence. In addition, the terms "including", "having", and any other variant thereof are intended to cover non-exclusive inclusion. For example, a process, a method, a system, a product, or a device that includes a series of steps or units is not limited to steps or units that have been listed, but optionally further includes an unlisted step or unit, or optionally further includes another step or unit inherent to the process, the method, the product, or the device.

"An embodiment" mentioned in this specification indicates that a particular characteristic, structure or feature described with reference to embodiments may be included in at least one embodiment of this application. The phrase may neither necessarily mean a same embodiment, nor mean an independent or optional embodiment exclusive from another embodiment. It is explicitly and implicitly understood by persons skilled in the art that embodiments described in this specification may be combined with other embodiments.

In this application, "at least one (item)" means one or more, "a plurality of" means two or more, "at least two (items)" means two or three or more, and "and/or" describes an association relationship between associated objects, and indicates that three relationships may exist. For example, "A and/or B" may indicate: only A exists, only B exists, and both A and B exist. A and B may be singular or plural. A character "/" generally indicates an "or" relationship between associated objects before and after the character. "At least one of the following items (pieces)" or a similar expression thereof refers to any combination of these items, including a single item (piece) or any combination of a plurality of items (pieces). For example, at least one of a, b, or c may indicate a, b, c, a and b, a and c, b and c, or a, b, and c, where a, b, and c may be singular or plural.

To better understand embodiments of this application, the following first describes a system architecture in embodiments of this application.

The technical solutions in embodiments of this application may be applied to various communication systems, for example, a global system of mobile communication (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a 5th generation (5G) system or new radio (NR), and a future communication system.

Figure 1:
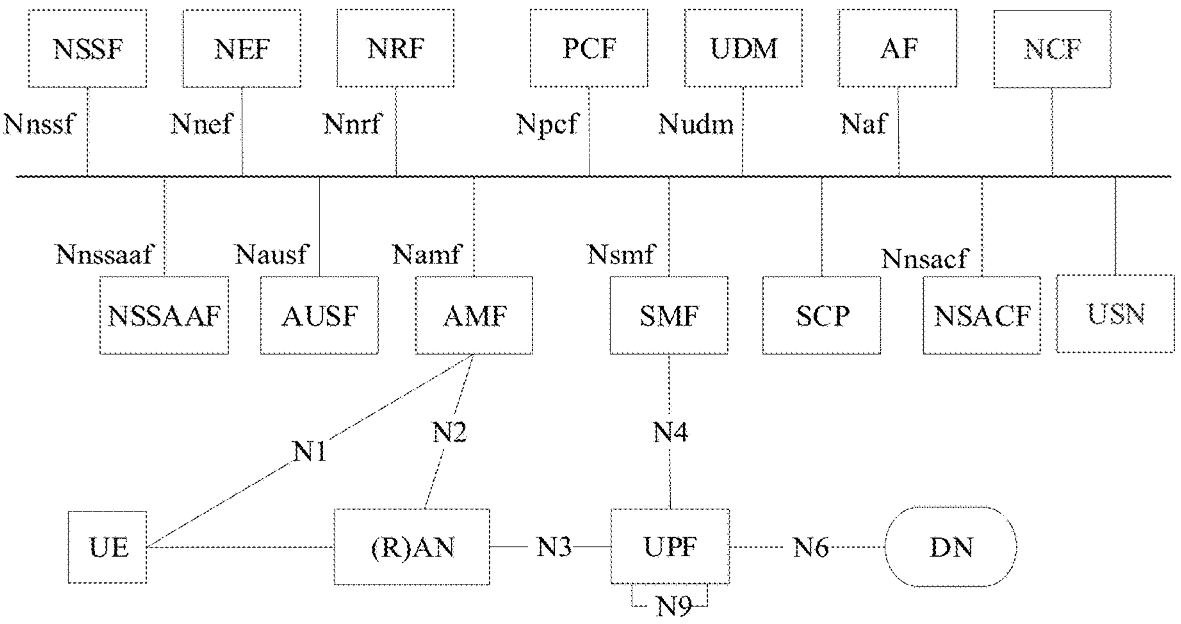
FIG. 1 is a schematic diagram of a system architecture according to this application.

FIG. 1 is a schematic diagram of a system architecture according to an embodiment of this application. The system architecture shown in FIG. 1 includes a terminal device, an access network device, a core network device, and a data network. The following separately describes in detail the terminal device, the access network device, the core network device, and the data network that are related in the system architecture in FIG. 1.

1. Terminal Device

The terminal device includes a device that provides voice and/or data connectivity for a user. For example, the terminal device is a device that has a wireless receiving and sending function, and may be deployed on land, including indoor or outdoor, handheld, wearable, or vehicle-mounted; or may be deployed on a water surface (for example, on a ship); or may be deployed in the air (for example, on an airplane, a balloon, or a satellite). The terminal may be a mobile phone, a tablet computer, a computer with a wireless receiving and sending function, a virtual reality (VR) terminal device, an augmented reality (AR) terminal device, a wireless terminal in industrial control, a vehicle-mounted terminal device, a wireless terminal in self-driving, a wireless terminal in remote medical, a wireless terminal in smart grid, a wireless terminal in transportation safety, a wireless terminal in smart city, a wireless terminal in smart home, or a wearable terminal device. An application scenario is not limited in embodiments of this application. Alternatively, the terminal sometimes may be referred to as a terminal device, user equipment (UE), an access terminal device, a vehicle-mounted terminal, an industrial control terminal, a UE unit, a UE station, a mobile station, a mobile console, a remote station, a remote terminal device, a mobile device, a UE terminal device, a terminal device, a wireless communication device, a UE agent, a UE apparatus, or the like. The terminal may be fixed or movable. In this application, UE is used to represent a terminal device in the following.

2. Radio Access Network (RAN) Device

An interface between the RAN and a terminal device may be a Uu interface (or referred to as an air interface). Certainly, in future communication, names of these interfaces may remain unchanged, or may be replaced by other names. This is not limited in this application.

The RAN is a node or a device that connects the terminal device to a wireless network. The RAN may be any device with a wireless receiving and sending function, including but not limited to: an evolved NodeB (NodeB, eNB, or e-NodeB) in LTE, a base station (gNodeB, or gNB) or a transmission reception point (TRP) in NR, a base station subsequently evolved in 3GPP, an access node in a Wi-Fi system, a wireless relay node, a wireless backhaul node, and the like. The base station may be a macro base station, a micro base station, a pico base station, a small cell, a relay station, a balloon station, or the like. A plurality of base stations may support networks using a same technology mentioned above, or may support networks using different technologies mentioned above. The base station may include one or more co-site or non-co-site TRPs. The RAN may also be a radio controller, a central unit (CU), and/or a distributed unit (DU) in a cloud radio access network (CRAN) scenario. The RAN may alternatively be a server, a wearable device, a vehicle-mounted device, or the like. The following uses an example in which the RAN is a base station for description. The plurality of RANs may be base stations of a same type, or may be base stations of different types. The base station may communicate with the terminal device, or may communicate with the terminal device through a relay station. The terminal device may communicate with a plurality of base stations using different technologies. For example, the terminal device may communicate with a base station supporting an LTE network, or may communicate with a base station supporting a 5G network, and may further support dual connections to a base station in an LTE network and a base station in a 5G network.

3. Core Network Device

In FIG. 1, a core network (CN) in a 5G network architecture is used as an example. The CN may include one or more CN devices (which may be understood as network element devices). For example, the CN device may include a network slice selection function (NSSF) network element, a network exposure function (NEF) network element, a network repository function (NRF) network element, a policy control function (PCF) network element, a unified data management (UDM) network element, an application function (AF) network element, a network control function (NCF) network element, a network slice specific authentication and authorization function (NSSAAF) network element, an authentication server function (AUSF) network element, an access and mobility management function (AMF) network element, a session management function (SMF) network element, a user plane function (UPF) network element, a service communication proxy (SCP) network element, a network slice admission control (NSACF) network element, a user service node (USN), and the like.

The AMF network element is a control plane network element provided by an operator network, and is responsible for access control and mobility management for accessing the operator network by a terminal device, for example, including functions such as mobility status management, temporary user identity allocation, and user authentication and authorization.

The SMF network element is a control plane network element provided by the operator network, and is responsible for managing a protocol data unit (PDU) session of the terminal device. The PDU session is a channel used to transmit a PDU, and the terminal device needs to transmit/receive a PDU to/from a DN through the PDU session. The SMF network element is responsible for establishment, maintenance, deletion, and the like of the PDU session. The SMF network element includes session-related functions such as session management (for example, session establishment, modification, and release, including tunnel maintenance between the UPF and a RAN), selection and control of the UPF network element, service and session continuity (SSC) mode selection, and roaming.

The PCF network element is a control plane function provided by an operator, including a user subscription data management function, a policy control function, a charging policy control function, quality of service (QoS) control, and the like, and is mainly configured to provide a policy for a PDU session for the SMF network element. The policy may include a charging-related policy, a QoS-related policy, an authorization-related policy, and the like. It should be noted that, in the 5G communication system, the policy control network element may be a policy control function (PCF); and in a future communication system (for example, a future 6th generation (6G) communication system), the policy control network element may still be named as PCF network element, or may have another name. This is not limited in this application.

The UPF network element is a gateway provided by the operator, and a gateway for communication between the operator network and the DN. The UPF network element includes functions related to a user plane, for example, data packet routing and transmission, packet detection, QoS processing, uplink packet detection, and downlink data packet storage.

The UDM network element is mainly configured to manage subscription data and authentication data of a user, and perform authentication credit processing, user identity processing, access authorization, registration/mobility management, subscription management, short message service message management, and the like. In some embodiments, the UDM may further include a unified data repository (UDR). Alternatively, in some other embodiments, a 3GPP SBA in the 5G system may further include the UDR. The UDR is configured to: store and retrieve a PCF policy, store and retrieve structured data for exposure, and store user information requested by the application function.

The USN may be understood as an integration of core network control functions, and is a core network network element that serves the UE exclusively. For example, the USN may integrate functions of session management (SM) and/or policy management (PM). Alternatively, the USN may be understood as a digital twin function of the UE in the core network, and is a digital model of real behavior of the UE, for example, functions such as recording a location of the UE, used service information, and artificial intelligence (AI) processing. Alternatively, the USN may be understood as similar to a cloud server (cloud computer). The UE may orchestrate, on the cloud server, resources provided by the operator, for example, QoS setting and bandwidth allocation of different services. It should be noted that the USN may be integrated into a 5G network architecture as shown in FIG. 1. Alternatively, the USN may exist in a form of a user-centric network (UCN) architecture. In this case, the UCN architecture may be understood as a network centering on users. Refer to a UCN network architecture shown in FIG. 2. The UCN network architecture shown in FIG. 2 includes a network service node (NSN) and a user service node (USN). Main functions of the NSN include authentication of the accessed UE, creation of the USN, and life cycle management.

The NCF network element is configured to manage USN resources in the UCN network architecture, for example, responsible for operations such as generating, changing, and deleting the USN.

It should be understood that the NSN network element, the USN network element, and the NCF network element in this application are merely example names, and should not be construed as a limitation thereto. In other words, the NSN network element, the USN network element, and the NCF network element may use other names in a technical solution other than this application, or may be other communication devices with same functions. For example, the NSN may be an access control function, the NCF may be a network resource control or management function, and the USN may be a terminal digital twin function.

4. Data Network (DN)

The DN, also referred to as a packet data network (PDN), is a network outside the operator network. The operator network may access a plurality of DNs. Application servers corresponding to a plurality of services may be deployed in the DN, to provide a plurality of possible services for the terminal device. The DN stores subscriber privacy data (such as subscription data or policy data).

Figure 2:
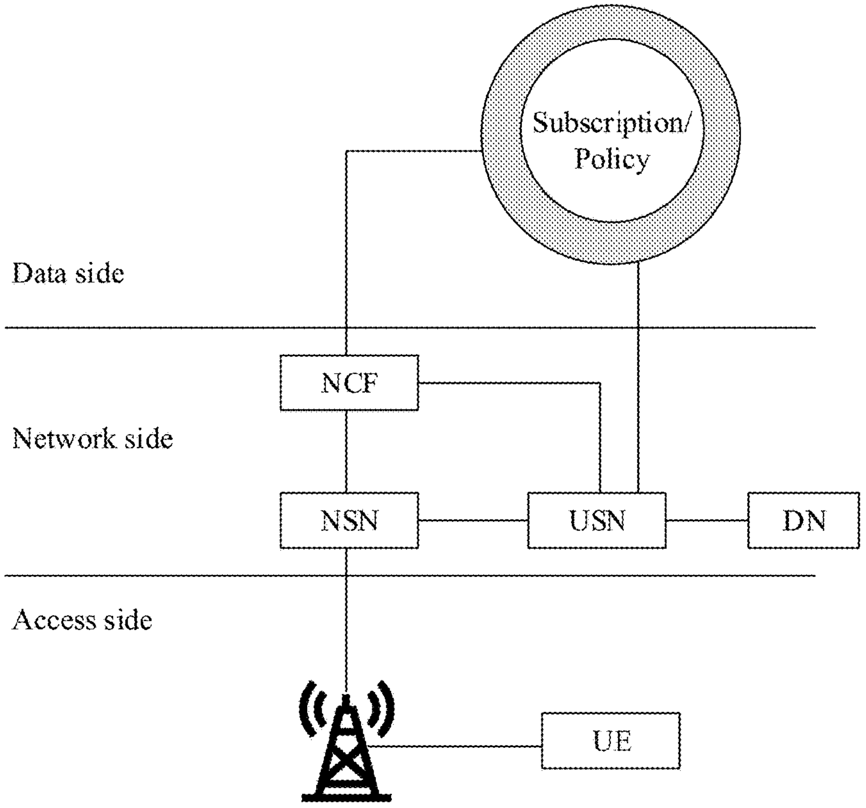
FIG. 2 is a schematic diagram of a structure of a user-centric network according to this application.

It should be learned that Nnssf, Nnef, Nnrf, Npcf, Nudm, Naf, Nnssaaf, Nausf, Namf, Nsmf, Nnsacf, N1, N2, N3, N4, N6, and N9 in FIG. 2 are interface sequence numbers. For meanings of these interface sequence numbers, refer to meanings of definitions in related standard protocols. This is not limited herein.

It may be understood that the 5G communication system is used as an example for illustration in FIG. 1. The solutions in embodiments of this application are applicable to another possible communication system, for example, an LTE communication system or a 6G communication system. The foregoing network element or function may be a network element in a hardware device, may be a software function run on dedicated hardware, or may be instantiated virtualization functions on a platform (for example, a cloud platform). Optionally, the foregoing network element or function may be implemented by one device, or may be jointly implemented by a plurality of devices, or may be a function module in one device. This is not limited in embodiments of this application.

The following further describes, with reference to the accompanying drawings, a network resource management method and a communication apparatus provided in this application.

Figure 3:
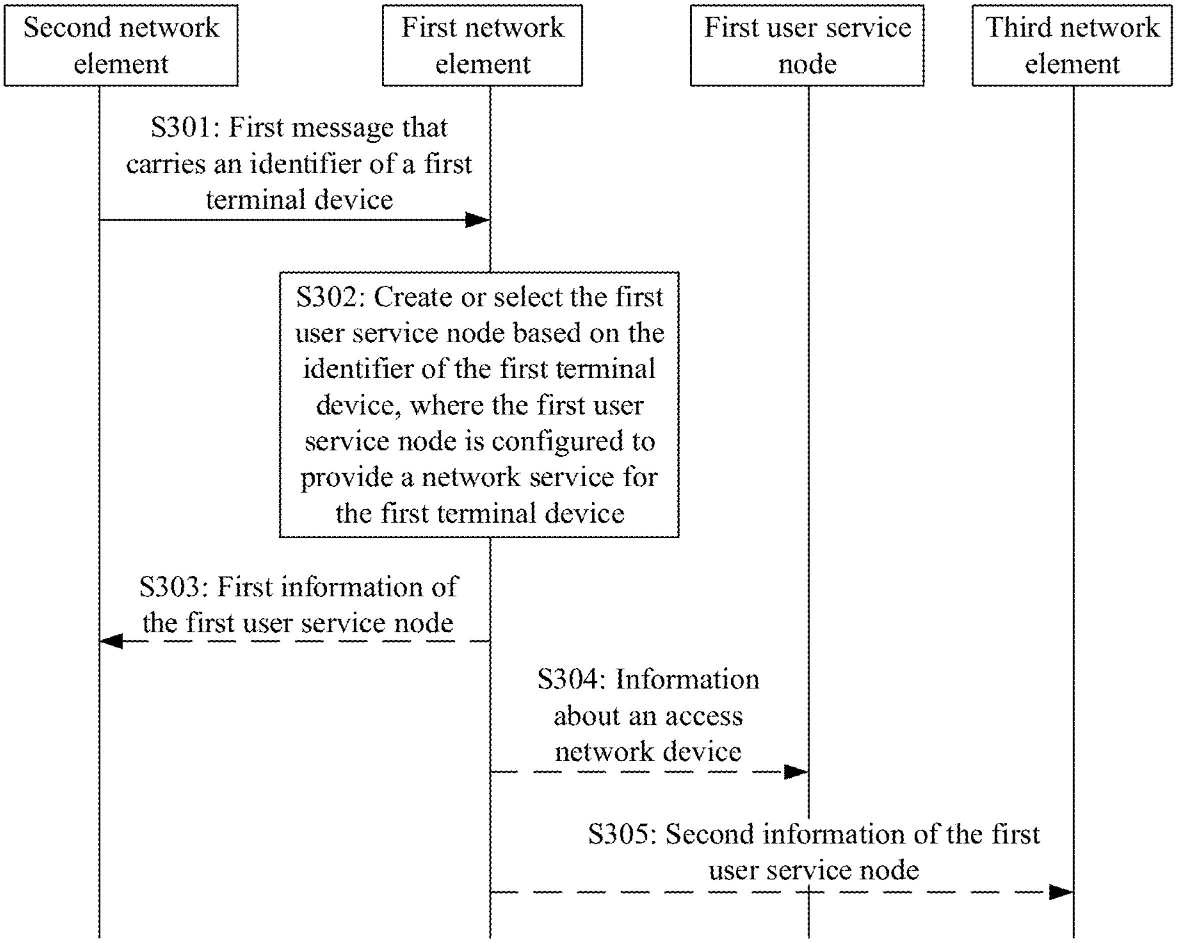
FIG. 3 is a schematic flowchart of a network resource management method according to this application.

FIG. 3 is a schematic flowchart of a network resource management method according to an embodiment of this application. As shown in FIG. 3, the network resource management method may be executed by a first network element or a chip in the first network element, or may be executed by a second network element or a chip in the second network element. FIG. 3 is described by using an example in which the first network element and the second network element execute the method.

S301: the first network element receives a first message from the second network element, where the first message carries an identifier of a first terminal device, and the first message is used to request to create or select a first user service node corresponding to the first terminal device.

It should be understood that the user service node in this application may be a user service function entity (for example, a user service node (USN) network element or a USN function entity), or may be a user service logical resource. The second network element may be any one of a network service node (for example, a network service node (NSN) network element), an AMF network element, or another network service network element. This is not limited herein. It should be noted that, unless otherwise specified, for the second network element in this application, refer to the descriptions herein. The first network element may be a user service node (for example, a default user service node (default USN) configured by the network service node) configured by a network service node, or may be a network element other than a user service node (for example, a network control function (NCF) network element). It should be noted that, unless otherwise specified, for the first network element in this application, refer to the descriptions herein.

The second network element receives a sixth message from the first terminal device via an access network device, where the sixth message carries identifier information of the first terminal device. Further, the second network element sends the first message to the first network element based on the sixth message. The sixth message may be any one of a non-access stratum (NAS) message, a registration request message, a service request message, a session establishment message, or a user service node creation request message. The first message is one of a NAS message, a registration request message, a service request message, a session establishment message, or a user service node creation request message.

It should be noted that the first message may be the same as or different from the sixth message. Details are as follows:

In a scenario in which the first message is the same as the sixth message, it may be understood that after the second network element receives the sixth message from the first terminal device, the second network element forwards the sixth message to the first network element.

In a scenario in which the first message is different from the sixth message, it may be understood that after the second network element receives the sixth message from the first terminal device, the second network element constructs the first message based on the sixth message, and sends the first message to the first network element. For example, the second network element stores (or maintains) a mapping relationship between a terminal device and a user service node, or it may be understood as that the second network element stores a correspondence between an identifier of a terminal device and an identifier (or an address) of a user service node. In this case, after the second network element receives a service request message (namely, the sixth message) from the first terminal device, if the second network element does not discover (or detect) the user service node corresponding to the first terminal device, the second network element sends a user service node creation request message (namely, the first message) to the first network element, so that the first network element creates, based on the first message, the user service node corresponding to the first terminal device.

S302: the first network element creates or selects the first user service node based on the identifier of the first terminal device, where the first user service node is configured to provide a network service for the first terminal device.

In other words, in one case, the first network element may create one first user service node to provide a network service for the first terminal device. In another case, because a function of the first network element includes management for a user service node, it may be understood that the first network element can learn a network capability of each user service node. In this case, the first network element may select (or determine) one first user service node from a plurality of user service nodes managed by the first network element, to provide a network service for the first terminal device. The network service includes but is not limited to one or more of data downloading, data access, and call.

In a possible implementation, the first network element obtains subscription information or policy information of the first terminal device from a third network element based on the identifier of the first terminal device; and the first network element creates or selects the first user service node based on the subscription information or the policy information of the first terminal device, where a network capability of the first user service node matches the subscription information or the policy information of the first terminal device. The third network element includes the subscription information or the policy information corresponding to the first terminal device. In other words, the third network element stores the subscription information (or understood as subscription data) or policy information of the first terminal device. For example, the third network element may be one or more of a DN, a PCF, a UDM network element, or a UDR. It should be noted that, unless otherwise specified, for the third network element in this application, refer to the descriptions herein.

The subscription information or the policy information includes one or more of the following information: access-related subscription information or policy information (for example, an access control function, location control, and time control); session-related subscription information or policy information (for example, an Internet service function, a service provided by an operator, a slice service, and a customized network function service); and data transmission-related subscription information or policy information (for example, a QoS parameter, a data packet loss rate, a delay, a bandwidth, and a network speed). The network capability includes one or more of the following information: a mobility management (MM) capability, a SM capability, or a PM capability.

That the network capability of the first user service node matches the subscription information or the policy information of the first terminal device may be understood as that an MM of the first user service node matches access/mobility-related subscription information (or policy information) of the first terminal device, an SM of the first user service node matches session-related subscription information (or policy information) of the first terminal device, and a PM of the first user service node corresponds to data transmission-related subscription information (or policy information) of the first terminal device.

In other words, the MM of the first user service node performs access management on the terminal device based on the access/mobility-related subscription information (or policy information) of the first terminal device. For example, the policy information of the first terminal device includes: when the first terminal device is in an area A, the first terminal device does not have network service permission. In this case, when learning that the first terminal device is in the area A, the MM of the first user service node corresponding to the first terminal device does not provide a network service for the first terminal device. The SM of the first user service node performs session control management based on the session-related subscription information (or policy information) of the first terminal device. For example, the subscription information of the first terminal device includes access permission of the first terminal device for data A but does not include download permission for data B. In this case, the SM of the first user service node corresponding to the first terminal device may provide the first terminal device with a network service for accessing the data A, but does not provide the first terminal device with a network service for downloading the data B. The PM of the first user service node performs control management on data transmission based on the data transmission-related subscription information (or policy information) of the first terminal device. For example, the subscription information of the first terminal device includes: a maximum bandwidth for data transmission is 10 Mbps and a maximum transmission delay for the data transmission is 0.5 ms. In this case, the PM of the first user service node corresponding to the first terminal device provides the first terminal device with the data transmission of maximum bandwidth of 10 Mbps and maximum transmission delay of 0.5 ms.

It should be learned that the PM of the first user service node may further include some terminal feature capabilities, for example, a vehicle-to-everything (V2X) communication capability, a proximity service (ProSe) communication capability, and an uncrewed aerial vehicle communication capability.

The following provides detailed descriptions in which the first network element creates the first user service node and that the first network element selects the first user service node.

Case 1: the first network element creates the first user service node corresponding to the first terminal device.

The first network element sends a request message to the third network element, where the request message carries the identifier information of the first terminal device, and the request message is used to obtain the subscription information or the policy information of the first terminal device. The third network element sends the subscription information or the policy information of the first terminal device to the first network element based on the request message. Further, the first network element creates the first user service node, and determines the network capability of the first user service node based on the subscription information or the policy information of the first terminal device, so that the network capability of the first user service node matches the subscription information or the policy information of the first terminal device, and the network capability of the first user service node can support the network services related to the first terminal device.

Case 2: the first network element selects the first user service node corresponding to the first terminal device.

In an implementation of this case, that the first network element manages at least one user service node may be understood as that the first network element can obtain a network capability of each user service node in the at least one user service node. In this case, the first network element sends a request message to the third network element, where the request message carries the identifier information of the first terminal device, and the request message is used to obtain the subscription information or the policy information of the first terminal device. The third network element sends the subscription information or the policy information of the first terminal device to the first network element based on the request message. Further, the first network element may determine the first user service node from the at least one user service node based on the subscription information or the policy information of the first terminal device, where the network capability of the first user service node matches the subscription information or the policy information of the first terminal device, and the network capability of the first user service node can support the network services related to the first terminal device.

In another implementation of this case, that one user service node may serve a group of terminal devices may be understood as that the group of terminal devices have same subscription information and policy information, the group of terminal devices have a same group identifier, and an identifier of the user service node is associated with the group identifier. In this case, the first network element receives a first message from the second network element, where the first message carries an identifier of a terminal device, and the identifier of the terminal device includes an identifier of a terminal device group and an index of the terminal device in the terminal device group. The first network element determines, based on the group identifier of the terminal device, a first user service node from the at least one user service node managed by the first network element. An identifier of the first user service node corresponds to the group identifier of the terminal device. In this case, it may be considered that a network capability of the first user service node matches the subscription information or the policy information of the first terminal device, and the network capability of the first user service node can support the network services related to the first terminal device.

It should be learned that, in an implementation, before the first network element obtains the subscription information or the policy information of the first terminal device from the third network element, the first network element may verify the first terminal device based on the identifier information of the first terminal device. The first network element sends the request message to the third network element to obtain the subscription information or the policy information of the first terminal device only when verifying that the first terminal device is a valid terminal device (that is, the first terminal device is a real terminal device registered by the user). Alternatively, in another implementation, after the third network element receives, from the first network element, the request message for obtaining the subscription information or the policy information of the first terminal device, the third network element authenticates an identity of the first network element based on the request message. The third network element sends the subscription information or the policy information of the first terminal device to the first network element only after determining the identity of the first network element (that is, determining that the first network element has operation permission for obtaining the subscription information or the policy information of the first terminal device). In this implementation, security of the subscription information or the policy information of the terminal device can be improved, and user privacy can be protected.

For example, before the first network element sends, to the third network element, the request message for obtaining the subscription information or the policy information of the first terminal device, the first network element sends an authentication and authorization request to an AUSF network element (or another network element, where the another network element is a network element that needs to record obtaining the subscription information (or policy information) of the terminal device from the third network element), and the authentication and authorization request carries the identifier information of the first terminal device and identifier information of the first network element, the AUSF network element (or the another network element, where the another network element is the network element that needs to record obtaining the subscription information (or policy information) of the terminal device from the third network element) verifies, based on the identifier information of the first terminal device, whether the first terminal device is a valid terminal device. The AUSF network element (or the another network element, where the another network element is the network element that needs to record obtaining the subscription information (or policy information) of the terminal device from the third network element) verifies, based on the identifier information of the first network element, whether an identity of the first network element is valid (which may be understood as whether the identity of the first network element is real). The AUSF network element (or the another network element, where the another network element is the network element that needs to record obtaining the subscription information (or policy information) of the terminal device from the third network element) sends a verification result to the first network element after sending verification completion to the first network element. In a possible implementation, when the verification on the identifier information of the first terminal device and the identifier information of the first network element performed by the AUSF network element (or the another network element, where the another network element is the network element that needs to record obtaining the subscription information (or policy information) of the terminal device from the third network element) succeeds, the AUSF network element sends authentication and authorization success notification information to the first network element, where the authentication and authorization success notification information includes a key (or token), and the key (or token) is used to obtain the subscription information or the policy information of the first terminal device from the third network element. When sending, to the third network element, the request message for obtaining the subscription information or the policy information of the first terminal device, the first network element uses the request message to carry the key (or token).

In an implementation, after the first network element creates or selects the first user service node corresponding to the first terminal device, the first network element may further perform one or more of the following optional operation steps S303 to S305. It should be understood that an execution sequence of S303 to S305 is not limited in this application. The following is merely an example for ease of description.

Optionally, in S303, the first network element sends first information of the first user service node to the second network element. The first information includes one or more of the identifier of the first user service node, address information of the first user service node, status information of the first user service node, or the network capability of the first user service node. The status information of the user service node includes a suspended state (that is, a standby state or a to-be-activated state) and an activated state of the user service node. It should be learned that when the user service node provides network services for a plurality of terminal devices, a status of the user service node may be refined into a status of a network resource corresponding to each terminal device, and the status of the network resource corresponding to each terminal device in the user service node may further be refined into a suspended state or an activated state.

After the first network element creates or selects the first user service node, the second network element receives the first information of the first user service node from the first network element, and stores the first information of the first user service node. For example, the second network element receives, from the first network element, first information of a user service node 2 corresponding to a terminal device 2. Further, the second network element associates the terminal device 2 and the first information of the user service node 2 for association storage. FIG. 1 shows a mapping relationship (or referred to as an association relationship) between a terminal device and a user service node.

TABLE 1

| Terminal device | Identifier of a user service node | Address of the user service node | Network capability of the user service node |
|---|---|---|---|
| Terminal device 1 | User service node 1 | Address 1 | SM function information 1, PM function information 1, and MM function information 1 |
| Terminal device 2 | User service node 2 | Address 2 | SM function information 2, PM function information 2, and MM function information 2 |

In this implementation, the second network element is communicatively connected to the first user service node based on the first information of the first user service node, so that the second network element may forward, based on the mapping relationship between the terminal device and the user service node after the second network element subsequently receives a message (which may be understood as a message for requesting the first user service node to provide a network service) of the terminal device by using the access network device, the message of the terminal device to the user service node corresponding to the terminal device.

In another possible implementation, the second network element may further receive the first information of the first user service node from the first user service node. It may be understood that, after the first network element creates the first user service node, the first network element sends information about the second network element (for example, address information of the second network element) to the first user service node. Further, after the first user service node is communicatively connected to the second network element based on the information about the second network element, the first user service node sends the first information of the first user service node to the second network element.

Optionally, in S304, the first message further includes information about the access network device. The information about the access network device includes an identifier of the access network device and/or address information of the access network device; and there is a communication connection between the access network device and the first terminal device. In this case, the first network element may further send the information about the access network device to the first user service node.

The first network element receives the first message from the second network element. After the first network element creates or selects the first user service node, a communication connection may be established between the first user service node and the access network device, so that the access network device may directly forward, after the access network device subsequently receives a message (which may be understood as a message for requesting the first user service node to provide a network service) of the terminal device, the message of the terminal device to the first user service node, to omit a process of sending the message of the terminal device from the access network device to the second network element from and then forwarding the message from the second network element to the first user service node. An implementation includes but is not limited to the following possible implementations:

Manner 1: the first network element sends the information about the access network device to the first user service node, so that the first user service node establishes the communication connection to the access network device based on the information about the access network device.

Manner 2: after the second network element establishes the communication connection to the first user service node, the second network element sends the information about the access network device to the first user service node, so that the first user service node establishes the communication connection to the access network device based on the information about the access network device.

Manner 3: after the second network element establishes the communication connection to the first user service node, the second network element sends the first information of the first user service node to the access network device, so that the access network device establishes the communication connection to the first user service node based on the first information of the first user service node.

Optionally, in S305, the first network element sends second information of the first user service node to the third network element, where the second information includes the identifier of the user service node and/or the address information of the user service node.

After the first network element creates or selects the first user service node corresponding to the first terminal device, the first network element sends the identifier of the first user service node and/or the address of the first user service node to the third network element that stores the subscription information (or policy information) of the first terminal device. After receiving the identifier of the first user service node and/or the address of the first user service node, the third network element stores (or is understood as performing association storage with the first terminal device) the identifier of the first user service node and/or the address of the first user service node. Alternatively, in another possible implementation, after the first network element creates or selects the first user service node corresponding to the first terminal device, the first user service node may send the second information of the first user service node to the third network element.

In other words, after the first network element creates or selects the first user service node corresponding to the first terminal device, the second information of the first user service node may be sent to the third network element by the first network element, or the second information of the first user service node may be sent to the third network element by the first user service node.

According to the method shown in FIG. 3, when no user service node provides a network service for the terminal device, the first network element may create or select a user service node based on subscription information of the terminal device.

Figure 4:
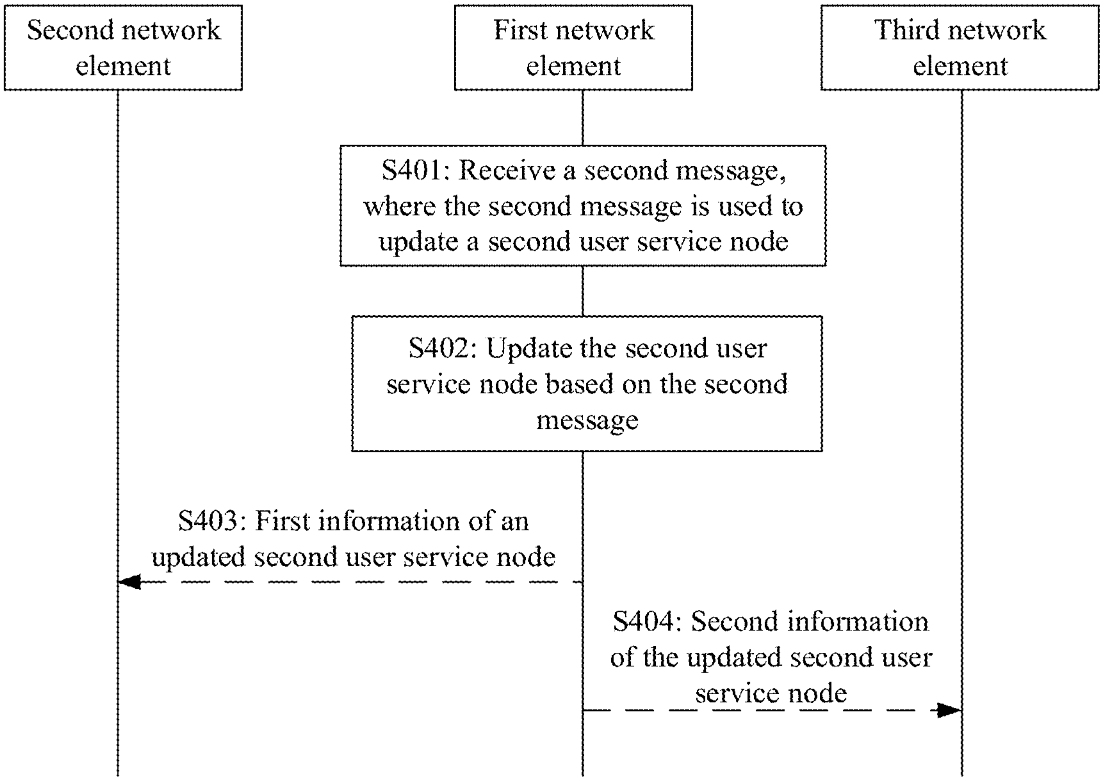
FIG. 4 is a schematic flowchart of another network resource management method according to this application.

FIG. 4 is a schematic flowchart of another network resource management method according to an embodiment of this application. As shown in FIG. 4, the network resource management method may be executed by a first network element or a chip in the first network element, or may be executed by a second network element or a chip in the second network element. FIG. 4 is described by using an example in which the first network element and the second network element execute the method.

S401: the first network element receives a second message, where the second message is used to update a second user service node.

When the second user service node, the second network element, or a third network element detects that the second user service node needs to be updated (the update herein may be understood as update of one or more of identifier information of the second user service node, address information of the second user service node, or a network capability of the second user service node), the second user service node, the second network element, or the third network element sends the second message to the first network element, to request (or notify) the first network element to update the second user service node. The second message may be understood as a trigger message used to update the second user service node, and when the second message is from different network element devices, content of the second message may be different. The following describes in detail the content of the second message and a trigger scenario for sending the second message.

Scenario 1: the second message is from the second user service node. The second message carries third information, the third information indicates that the second user service node receives no signaling corresponding to a second terminal device within first duration, and the second terminal device is a terminal device for which the second user service node provides a network service.

In other words, when the second user service node detects that the second terminal device (that is, the terminal device for which the second user service node provides the service) corresponding to the second user service node does not request, within the first duration, the second user service node to provide the service (for example, no message or heartbeat packet from the second terminal device is received), the second user service node sends, to the first network element, the second message that carries the third information.

For example, the first duration is one week, and the user service node 2 provides a network service for the terminal device 2. In this case, when the user service node 2 receives, within one week, no trigger signaling (or understood as a request message) for providing the network service for the terminal device 2, the user service node 2 sends, to the first network element, the second message that carries the third information.

It should be noted that a value of the first duration may be set and adjusted based on a situation. This is not limited herein. The third information may be a character string or a cause value. A representation form of the third information is not limited in this application. For example, the third information is a character A in the second message. When a value of the character A in the second message is 1, it indicates that the second user service node receives no signaling corresponding to the second terminal device within the first duration.

Scenario 2: the second message is from the second user service node or the second network element. The second message carries fourth information, and the fourth information indicates that a network capability of an access network device does not match the network capability of the second user service node. There is a communication connection between the second user service node and the access network device, and there is a communication connection between the second network element and the access network device.

In other words, the access network device is connected to the second terminal device. When the access network device detects that the network capability of the access network device does not match the network capability of the second user service node corresponding to the second terminal device, the access network device sends, to the second user service node or the second network element, indication information indicating that the network capabilities do not match, and the second user service node or the second network element sends, to the first network element based on the indication information, the second message that carries the fourth information. The fourth information may be a character string or a cause value. A representation form of the fourth information is not limited in this application.

For example, the access network device is connected to the second terminal device, a transmission rate that can be guaranteed by the access network device is 5 Mbps, the second user service node provides a network service for the second terminal device, and the network capability of the second user service node includes a transmission rate, of 10 Mbps, that needs to be guaranteed. In this case, if the access network device detects that the network capability of the access network device does not match the network capability of the second user service node, the access network device sends, to the second user service node or the second network element, the indication information indicating that the network capabilities do not match. Further, the second user service node or the second network element sends, to the first network element based on the indication information, the second message that carries the fourth information.

Alternatively, in another possible implementation, when the access network device detects that the network capability of the access network device does not match the network capability of the second user service node corresponding to the second terminal device, the access network device sends, to the first network element by using the second user service node or the second network element, the second message that carries the fourth information. It may be understood that the access network device sends the second message to the second user service node or the second network element, and the second user service node or the second network element forwards the second message to the first network element.

Scenario 3: the second message is from the third network element, the third network element includes subscription information or policy information corresponding to the second terminal device, and the second terminal device is a terminal device for which the second user service node provides a network service. The second message carries fifth information, and the fifth information indicates that the subscription information or the policy information of the second terminal device changes.

In other words, the third network element stores the subscription information or the policy information corresponding to the second terminal device. When the third network element detects that the subscription information or the policy information corresponding to the second terminal device changes, the third network element sends, to the first network element, the second message that carries the fifth information. The fifth information may be a character string or a cause value in the second message. A representation form of the fifth information is not limited in this application.

For example, the policy information of the second terminal device in the third network element includes: in an area A, the second terminal device has no network access permission. When the third network element detects that the subscription information or the policy information of the second terminal device changes, for example, the policy information of the second terminal device changes to: in the area A, the second terminal device has network access permission. In this case, the third network element sends, to the first network element, the second message that carries the fifth information. The second message may include changed subscription information or policy information. For example, herein, the second terminal device may access a network in the area A.

S402: the first network element updates the second user service node based on the second message.

The first network element updates the second user service node based on a source of the second message and information carried in the second message. The following provides detailed descriptions with reference to the scenarios in S401.

Scenario 1: the second message is from the second user service node. The second message carries the third information, and the third information indicates that the second user service node receives no signaling corresponding to the second terminal device within the first duration. This corresponds to Scenario 1 described in S401. In this scenario, an update operation carried in the second message is releasing or suspending the second user service node.

In this scenario, the first network element releases or suspends a resource of the second user service node, or releases or suspends a resource that is in the second user service node and that is provided for the second terminal device.

In other words, when the second user service node provides a network service for only the second terminal device, after the first network element receives the second message that carries the third information, the first network element may directly release or suspend the network resource of the second user service node. Alternatively, when the second user service node provides a network service for at least two terminal devices, after the first network element receives the second message that carries the third information, the first network element may directly release or suspend a network resource corresponding to the second terminal device in the second user service node.

It should be understood that, that the network resource of the second user service node is released may be understood as that the first network element deletes an identifier of the second user service node from maintained user service node information, deletes the address information of the second user service node, and releases the network capability of the second user service node. That the network resource corresponding to the second terminal device in the second user service node is released may be understood as that the first network element releases, in maintained user service node information, only a network capability corresponding to the second terminal device, and reserves a network capability corresponding to another terminal device (a terminal device other than the second terminal device) in the second user service node. That the network resource of the second user service node is suspended may be understood as that the first network element sets a status of the second user service node to a suspended state (or a to-be-activated state) in maintained user service node information. That the network resource corresponding to the second terminal device in the second user service node is suspended may be understood as that the first network element sets, in maintained user service node information, only a status of a network capability corresponding to the second terminal device to a suspended state (or a to-be-activated state), and reserves a network capability corresponding to another terminal device (a terminal device other than the second terminal device) in the second user service node.

It should be known that, when the first network element suspends the second user service node or suspends the network resource corresponding to the second terminal in the second service node, and when the first network element detects the second terminal device (that is, a terminal device for which the second user service node provides a service) corresponding to the second user service node, the first network element requests the second user service node to provide a service (for example, receives any message or heartbeat packet from the second terminal device), and then the first network element activates the network resource corresponding to the second terminal in the second user service node or the network resource corresponding to the second service node.

It should be understood that, that the network resource of the second user service node is released may be understood as that the first network element deletes an identifier of the second user service node from maintained user service node information, deletes the address information of the second user service node, and releases the network capability of the second user service node. That the network resource corresponding to the second terminal device in the second user service node is released may be understood as that the first network element releases, in maintained user service node information, only a network capability corresponding to the second terminal device, and reserves a network capability corresponding to another terminal device (a terminal device other than the second terminal device) in the second user service node. That the network resource of the second user service node is suspended may be understood as that the first network element sets a status of the second user service node to a suspended state (or a to-be-activated state) in maintained user service node information. That the network resource corresponding to the second terminal device in the second user service node is suspended may be understood as that the first network element sets, in maintained user service node information, only a status of a network capability corresponding to the second terminal device to a suspended state (or a to-be-activated state), and reserves a network capability corresponding to another terminal device (a terminal device other than the second terminal device) in the second user service node.

It should be known that, when the first network element suspends the second user service node or suspends the network resource corresponding to the second terminal in the second service node, and when the first network element detects the second terminal device (that is, a terminal device for which the second user service node provides a service) corresponding to the second user service node, the first network element requests the second user service node to provide a service (for example, receives any message or heartbeat packet from the second terminal device), and then the first network element activates the network resource corresponding to the second terminal in the second user service node or the network resource corresponding to the second service node.

For ease of understanding, an example in which the second user service node provides a network service for only the second terminal device is used for description. For example, the second message received by the first network element is shown as the second message in the example in Scenario 1 in S401. The second information indicates that the user service node 2 (namely, the second user service node) receives, within one week (namely, the first duration), no trigger signaling (or understood as a request message) for providing a network service for the terminal device 2 (the second terminal device). In this case, the first network element releases a network resource of the user service node 2 (namely, the second user service node).

Scenario 2: the second message is from the second user service node or the second network element. The second message carries the fourth information, and the fourth information indicates that the network capability of the access network device does not match the network capability of the second user service node. This corresponds to Scenario 2 described in S401.

In this scenario, the fourth information may further include the network capability of the access network device, and the identifier of the second user service node or the address information of the second user service node. The first network element modifies the network capability of the second user service node based on the network capability of the access network device.

For example, the second message received by the first network element is shown as the second message in the example in Scenario 2 in S401. The fourth information may further include a transmission rate, of 5 Mbps, that can be guaranteed by the access network device. In this scenario, the first network element changes, based on the network capability of the access network device, the transmission rate included in the network capability of the second user service node from 10 Mbps to 5 Mbps.

Scenario 3: the second message is from the third network element. The second message carries the fifth information, and the fifth information indicates that the subscription information or the policy information of the second terminal device changes. This corresponds to Scenario 3 described in S401.

In this scenario, after the first network element receives the second message, the first network element obtains changed subscription information or policy information of the second terminal device from the third network element. Further, the first network element updates the second user service node based on the changed subscription information or policy information. In another possible implementation of the scenario, the second message further carries changed subscription information or policy information of the second terminal device. Further, the first network element updates the second user service node based on the changed subscription information or policy information in the second message. It may be understood that when access-related subscription information (or policy information) of the second terminal device changes, the first network element modifies an MM of the second user service node; when session-related subscription information (or policy information) of the second terminal device changes, the first network element modifies an SM of the second user service node; and when data transmission-related subscription information (or policy information) of the second terminal device changes, the first network element modifies a PM of the second user service node.

For example, the second message received by the first network element is shown as the second message in the example in Scenario 3 in S401, and the policy information of the second terminal device changes from "in the area A, the second terminal device has no network access permission" to "in the area A, the second terminal device has network access permission". In this case, the first network element modifies the network capability of the second user service node.

In an implementation, after the first network element updates the second user service node corresponding to the second terminal device, the first network element may further perform one or more of the following optional operation steps S403 or S404. It should be understood that an execution sequence of S403 and S404 is not limited in this application. The following is merely an example for ease of description.

Optionally, in S403, the first network element sends first information of an updated second user service node to the second network element. The first information includes one or more of an identifier of the updated second user service node, address information of the updated second user service node, status information of the updated second user service node, or a network capability of the updated second user service node.

After updating the second user service node, the first network element may obtain the identifier of the updated second user service node, the address information of the updated second user service node, or the network capability of the updated second user service node. The first network element may send the identifier of the updated second user service node, the address information of the updated second user service node, or the network capability of the updated second user service node to the second network element. Alternatively, the first network element sends update information of the updated second user service node to the second network element. For example, in comparison with the second user service node before update, if the update information of the updated second user service node is a network capability, the first network element sends the network capability of the updated second user service node to the second network element. The second network element receives the first information of the updated second user service node, and stores (or is understood as updating) the first information of the second user service node.

Optionally, in S404, the first network element sends second information of the updated second user service node to the third network element, where the second information includes the identifier of the updated second user service node and/or the address information of the updated second user service node.

After updating the second user service node, the first network element may obtain the identifier of the updated second user service node, the address information of the updated second user service node, or the network capability of the updated second user service node. When the first network element detects that the identifier or the address information of the updated second user service node changes compared with the identifier or the address information of the second user service node before update, the first network element sends the update information (namely, the identifier of the updated second user service node or the address information of the updated second user service node) of the updated second user service node to the third network element.

According to the method shown in FIG. 4, the first network element may update information about a user service node in real time. It should be noted that, in embodiments of this application, FIG. 3 and FIG. 4 are implementations that can be independently implemented. The first network element in FIG. 3 and the first network element in FIG. 4 may be two first network elements of a same type. The implementations in FIG. 3 and FIG. 4 may also be mutually referenced and superimposed, that is, the first network element in FIG. 3 and the first network element in FIG. 4 may be a same first network element.

Figure 5:
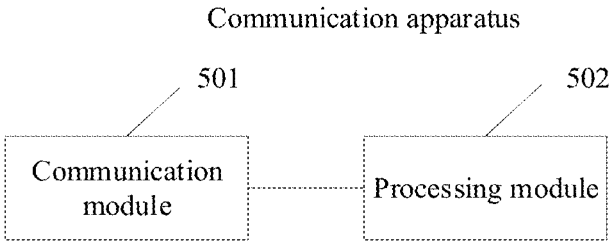
FIG. 5 is a schematic diagram of a structure of a communication apparatus according to this application.

FIG. 5 is a schematic diagram of a structure of a communication apparatus according to an embodiment of this application. The communication apparatus shown in FIG. 5 may be configured to implement some or all functions of the first network element in the embodiments corresponding to the network resource management methods, or the communication apparatus shown in FIG. 5 may be configured to implement some or all functions of the second network element in the embodiments corresponding to the network resource management methods.

In an embodiment, the communication apparatus shown in FIG. 5 may be configured to implement some or all functions of the first network element in the method embodiment described in FIG. 3 or FIG. 4. The apparatus may be the first network element, or may be an apparatus in the first network element, or may be an apparatus that can be used in a matching manner with the first network element. The communication apparatus may alternatively be a chip system. The communication apparatus shown in FIG. 5 may include a communication module 501 and a processing module 502.

The communication module 501 is configured to receive a first message from a second network element, where the first message carries an identifier of a first terminal device, and the first message is used to request to create or select a first user service node corresponding to the first terminal device.

The processing module 502 is configured to create or select the first user service node based on the identifier of the first terminal device, where the first user service node is configured to provide a network service for the first terminal device.

In a possible implementation, the communication module 501 is configured to obtain subscription information or policy information of the first terminal device from a third network element based on the identifier of the first terminal device, where the third network element includes the subscription information or the policy information corresponding to the first terminal device. The processing module 502 is configured to create or select the first user service node based on the subscription information or the policy information of the first terminal device, where a network capability of the first user service node matches the subscription information or the policy information of the first terminal device.

In a possible implementation, the communication module 501 is further configured to send first information of the first user service node to the second network element, where the first information includes one or more of an identifier of the first user service node, address information of the first user service node, status information of the first user service node, or the network capability of the user service node.

In a possible implementation, the communication module 501 is further configured to send second information of the first user service node to the third network element, where the second information includes the identifier of the user service node and/or the address information of the user service node.

In a possible implementation, the first message further includes information about an access network device; the information about the access network device includes an identifier of the access network device and/or address information of the access network device; and there is a communication connection between the access network device and the first terminal device. The communication module 501 is further configured to send the information about the access network device to the first user service node.

In a possible implementation, the first message is one of a non-access stratum message, a registration request message, a service request message, a session establishment message, or a user service node creation request message.

In an embodiment, the communication module 501 is configured to receive a second message, where the second message is used to update a second user service node. The processing module 502 is configured to update the second user service node based on the second message. The communication module 501 is further configured to send first information of an updated second user service node to the second network element, where the first information includes one or more of an identifier of the updated second user service node, address information of the updated second user service node, status information of the updated second user service node, or a network capability of the updated second user service node.

In a possible implementation, the communication module 501 is further configured to send second information of the updated second user service node to the third network element, where the second information includes the identifier of the updated second user service node and/or the address information of the updated second user service node, and the third network element includes subscription information or policy information corresponding to a second terminal device.

In a possible implementation, the second message is from the second user service node, the second message carries third information, the third information indicates that the second user service node receives no signaling corresponding to the second terminal device within first duration, and the second terminal device is a terminal device for which the second user service node provides a network service. The processing module 502 is configured to release or suspend a resource of the second user service node, or release or suspend a resource that is in the second user service node and that is provided for the second terminal device.

In a possible implementation, the second message is from the second user service node or the second network element; the second message carries fourth information, and the fourth information indicates that a network capability of the access network device does not match the network capability of the second user service node; there is a communication connection between the second user service node and the access network device, and there is a communication connection between the second network element and the access network device; and the fourth information includes the network capability of the access network device, the identifier of the second user service node, or the address information of the second user service node. The processing module 502 is configured to modify the network capability of the second user service node based on the network capability of the access network device.

In a possible implementation, the second message is from the third network element, the third network element includes the subscription information or the policy information of the second terminal device, the second terminal device is a terminal device for which the second user service node provides a network service, the second message carries fifth information, and the fifth information indicates that the subscription information or the policy information of the second terminal device changes. The processing module 502 is configured to: obtain, from the third network element, changed subscription information or policy information of the second terminal device; and update the second user service node based on the changed subscription information or policy information.

In a possible implementation, the first network element is a user service node configured by a network service node, or the first network element is a network element other than a network service node.

In a possible implementation, the second network element is one of a network service node, an access and mobility management function AMF network element, or a network service network element.

In a possible implementation, the user service node is a user service function entity or a user service logical resource.

In an embodiment, the communication apparatus shown in FIG. 5 may be configured to implement some or all functions of the second network element in the method embodiment described in FIG. 3 or FIG. 4. The apparatus may be the second network element, or may be an apparatus in the second network element, or may be an apparatus that can be used in a matching manner with the second network element. The communication apparatus may alternatively be a chip system. The communication apparatus shown in FIG. 5 may include a communication module 501 and a processing module 502.

The communication module 501 is configured to send a first message to a first network element, where the first message carries an identifier of a first terminal device, and the first message is used to request to create or select a first user service node corresponding to the first terminal device.

In a possible implementation, the communication module 501 is configured to receive first information of the first user service node, where the first information includes one or more of an identifier of the first user service node, address information of the first user service node, status information of the first user service node, or a network capability of the first user service node.

In a possible implementation, the first message further includes information about an access network device; the information about the access network device includes an identifier of the access network device and/or address information of the access network device; and there is a communication connection between the access network device and the first terminal device.

In a possible implementation, the communication module 501 is configured to send the information about the access network device to the first user service node.

In a possible implementation, the communication module 501 is configured to send first information of the first user service node to the access network device.

In a possible implementation, the first message is one of a non-access stratum message, a registration request message, a service request message, a session establishment message, or a user service node creation request message.

In an embodiment, the communication module 501 is configured to receive first information of an updated second user service node, where the first information of the updated second user service node is from the first network element or the second user service node, and the first information includes one or more of an identifier of the updated second user service node, address information of the updated second user service node, status information of the updated second user service node, or a network capability of the updated second user service node.

In a possible implementation, the communication module 501 is configured to send a second message to the first network element, where the second message is used to update the second user service node; the second message carries fourth information, and the fourth information indicates that a network capability of the access network device does not match a network capability of the second user service node; there is a communication connection between the second user service node and the access network device, and there is a communication connection between the second network element and the access network device; and the fourth information includes the network capability of the access network device, and an identifier of the second user service node or address information of the second user service node.

In a possible implementation, the first network element is a user service node configured by a network service node, or the first network element is a network element other than a network service node.

In a possible implementation, the second network element is one of a network service node, an access and mobility management function AMF network element, or a network service network element.

In a possible implementation, the user service node are user service function entities or user service logical resources.

For more detailed descriptions of the communication module 501 and the processing module 502, refer to related descriptions of the first network element or the second network element in the foregoing method embodiments. Details are not described herein again.

Figure 6:
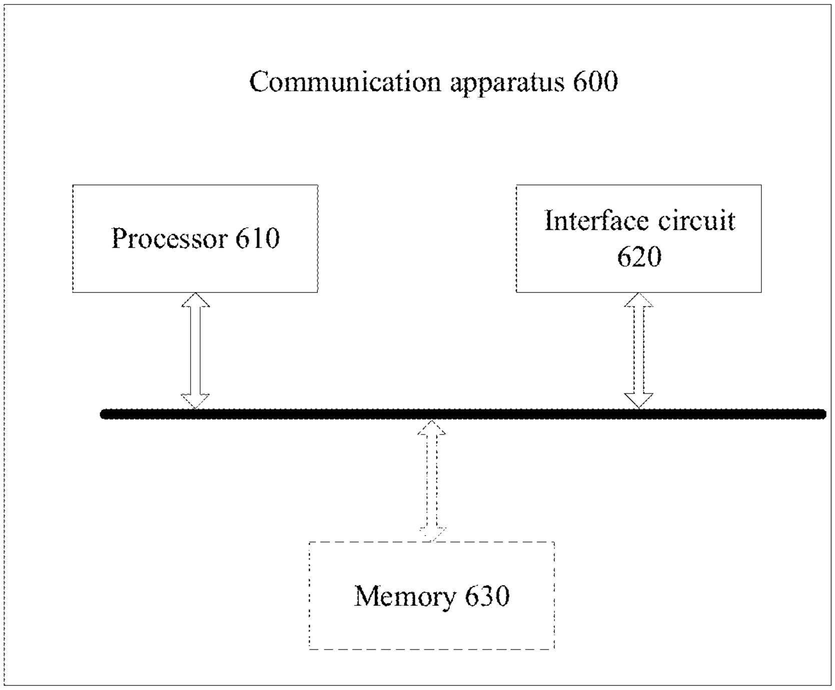
FIG. 6 is a schematic diagram of a structure of another communication apparatus according to this application.

FIG. 6 is a schematic diagram of a structure of a communication apparatus 600 according to this application. The communication apparatus 600 includes a processor 610 and an interface circuit 620. The processor 610 and the interface circuit 620 are coupled to each other. It may be understood that the interface circuit 620 may be a transceiver or an input/output interface. Optionally, the communication apparatus 600 may further include a memory 630, configured to store instructions executed by the processor 610, or store input data needed by the processor 610 to run instructions, or store data generated after the processor 610 runs instructions.

When the communication apparatus 600 is configured to implement the methods in the foregoing method embodiments, the processor 610 is configured to perform a function of the foregoing processing module 502, and the interface circuit 620 is configured to perform a function of the foregoing communication module 501.

When the communication apparatus is a chip used in a first network element, the chip of the first network element implements a function of the first network element in the foregoing method embodiments, and the chip of the first network element receives information from another network element; or the chip of the first network element sends information to the another network element.

When the communication apparatus is a chip used in a second network element, the chip of the second network element implements a function of the second network element in the foregoing method embodiments. The chip of the second network element receives information from another network element; or the chip of the second network element sends information to the another network element.

It may be understood that, the processor in embodiments of this application may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor, or any regular processor, or the like.

The method steps in embodiments of this application may be implemented in a hardware manner, or may be implemented in a manner of executing software instructions by the processor. The software instructions may include a corresponding software module. The software module may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to the processor, so that the processor can read information from the storage medium and write information into the storage medium. Certainly, the storage medium may alternatively be a component of the processor. The processor and the storage medium may be disposed in an ASIC. In addition, the ASIC may be located in an access network device or a terminal device. Certainly, the processor and the storage medium may exist in the first network element or the second network element as discrete components.

All or a part of the foregoing embodiments may be implemented by software, hardware, firmware, or any combination thereof. When software is used to implement embodiments, all or a part of the foregoing embodiments may be implemented in a form of a computer program product. The computer program product includes one or more computer programs or instructions. When the computer programs or instructions are loaded and executed on a computer, all or a part of the processes or functions in embodiments of this application are performed. The computer may be a general-purpose computer, a dedicated computer, a computer network, or other programmable apparatuses. The computer programs or instructions may be stored in a computer-readable storage medium, or may be transmitted through the computer-readable storage medium. The computer-readable storage medium may be any usable medium accessible by a computer, or a data storage device like a server integrating one or more usable media. The usable medium may be a magnetic medium, for example, a floppy disk, a hard disk, or a magnetic tape; may be an optical medium, for example, a DVD; or may be a semiconductor medium, for example, a solid state disk (SSD).

In embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

It may be understood that various numbers in embodiments of this application are merely used for differentiation for ease of description, and are not used to limit the scope of embodiments of this application. The sequence numbers of the foregoing processes do not mean execution sequences, and the execution sequences of the processes should be determined based on functions and internal logic of the processes.

An embodiment of this application further provides a computer-readable storage medium. The computer-readable storage medium stores computer-executable instructions. When the computer-executable instructions are executed, the method performed by the first network element or the second network element in the foregoing method embodiments is implemented.

An embodiment of this application further provides a computer program product. The computer program product includes a computer program. When the computer program is executed, the method performed by the first network element or the second network element in the foregoing method embodiments is implemented.

An embodiment of this application further provides a communication system. The communication system includes a first network element and a second network element. The first network element is configured to perform the method performed by the first network element in the foregoing method embodiment. The second network element is configured to perform the method performed by the second network element in the foregoing method embodiment.

It should be noted that, for brief description, the foregoing method embodiments are represented as a series of actions. However, persons skilled in the art should know that this application is not limited to the described order of the actions, because some steps may be performed in other orders or simultaneously according to this application. In addition, persons skilled in the art should further understand that embodiments described in this specification belong to example embodiments, and the related actions and modules are not necessarily required by this application.

Descriptions of embodiments provided in this application may refer to each other, and descriptions of embodiments have different focuses. For a part not described in detail in an embodiment, refer to related descriptions in another embodiment. For ease of description and brevity, for functions and performed steps of the apparatuses and devices provided in embodiments of this application, refer to related descriptions in the method embodiments of this application. Mutual reference, combination, or reference may be made between the method embodiments and between the apparatus embodiments.

Finally, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of embodiments of this application.

What is claimed is:

1. A method, wherein the method comprises:

receiving, by a first network element, a first message from a second network element, wherein the first message carries an identifier of a first terminal device, and the first message is used to request to create or select a first user service node corresponding to the first terminal device;

obtaining, by the first network element, subscription information or policy information of the first terminal device from a third network element based on the identifier of the first terminal device; and creating or selecting, by the first network element, the first user service node based on the subscription information or the policy information of the first terminal device, wherein a network capability of the first user service node matches the subscription information or the policy information of the first terminal device and the first user service node is configured to provide a network service for the first terminal device.

2. The method according to claim 1, wherein the third network element stores the subscription information or the policy information corresponding to the first terminal device.

3. The method according to claim 1, wherein after the creating or selecting, by the first network element, the first user service node, the method further comprises at least one of:

sending, by the first network element, first information of the first user service node to the second network element, wherein the first information comprises one or more of an identifier of the first user service node, address information of the first user service node, status information of the first user service node, or the network capability of the first user service node;

sending, by the first network element, second information of the first user service node to the third network element, wherein the second information comprises one or more of the identifier of the first user service node or the address information of the first user service node; or sending, by the first network element, information about an access network device to the first user service node, wherein the information about the access network device is included in the first message, the information about the access network device comprises one or more of an identifier of the access network device or address information of the access network device, and there is a communication connection between the access network device and the first terminal device.

4. The method according to claim 1, wherein the first message is a non-access stratum message, a registration request message, a service request message, a session establishment message, or a user service node creation request message.

5. The method according to claim 1, wherein the method further comprises:

receiving, by the first network element, a second message, wherein the second message is used to update a second user service node;

updating, by the first network element, the second user service node based on the second message; and sending, by the first network element, first information of an updated second user service node to the second network element, wherein the first information comprises one or more of an identifier of the updated second user service node, address information of the updated second user service node, status information of the updated second user service node, or a network capability of the updated second user service node.

6. The method according to claim 1, wherein the first user service node is a user service function entity or a user service logical resource.

7. The method according to claim 1, wherein the first network element is a user service node configured by a network service node.

8. A communication apparatus, comprising at least one processor coupled to at least one memory storing computer instructions, which when executed by the at least one processor, cause the communication apparatus to:

receive a first message from a second network element, wherein the first message carries an identifier of a first terminal device, and the first message is used to request to create or select a first user service node corresponding to the first terminal device;

obtain subscription information or policy information of the first terminal device from a third network element based on the identifier of the first terminal device; and create the first user service node based on the subscription information or the policy information of the first terminal device, wherein a network capability of the first user service node matches the subscription information or the policy information of the first terminal device and the first user service node is configured to provide a network service for the first terminal device.

9. The communication apparatus according to claim 8, wherein the third network element stores the subscription information or the policy information corresponding to the first terminal device.

10. The communication apparatus according to claim 8, wherein when the instructions are executed by the at least one processor, the communication apparatus is further caused to:

send first information of the first user service node to the second network element, wherein the first information comprises one or more of an identifier of the first user service node, address information of the first user service node, status information of the first user service node, or the network capability of the first user service node;

send second information of the first user service node to the third network element, wherein the second information comprises one or more of the identifier of the first user service node or the address information of the first user service node; or send information about an access network device to the first user service node, wherein the information about the access network device is included in the first message, the information about the access network device comprises one or more of an identifier of the access network device or address information of the access network device, and there is a communication connection between the access network device and the first terminal device.

11. The communication apparatus according to claim 8, wherein the first message is a non-access stratum message, a registration request message, a service request message, a session establishment message, or a user service node creation request message.

12. The communication apparatus according to claim 8, wherein when the instructions are executed by the at least one processor, the communication apparatus is further caused to:

receive a second message, wherein the second message is used to update a second user service node;

update the second user service node based on the second message; and send first information of an updated second user service node to a second network element, wherein the first information comprises one or more of an identifier of the updated second user service node, address information of the updated second user service node, status information of the updated second user service node, or a network capability of the updated second user service node.

13. The communication apparatus according to claim 8, wherein the first user service node is a user service function entity or a user service logical resource.

14. The communication apparatus according to claim 8, wherein the second network element is a network service node, an access and mobility management function (AMF) network element, or a network service network element.

15. A non-transitory computer-readable storage medium storing instructions which when executed by at least one processor cause a first network element to:

receive a first message from a second network element, wherein the first message carries an identifier of a first terminal device, and the first message is used to request to create or select a first user service node corresponding to the first terminal device;

obtain subscription information or policy information of the first terminal device from a third network element based on the identifier of the first terminal device; and create the first user service node based on the subscription information or the policy information of the first terminal device, wherein a network capability of the first user service node matches the subscription information or the policy information of the first terminal device and the first user service node is configured to provide a network service for the first terminal device.

16. The non-transitory computer-readable storage medium according to claim 15, wherein the third network element stores the subscription information or the policy information corresponding to the first terminal device.

17. The non-transitory computer-readable storage medium according to claim 15, wherein the instructions are executed to further cause the first network element to:

send first information of the first user service node to the second network element, wherein the first information comprises one or more of an identifier of the first user service node, address information of the first user service node, status information of the first user service node, or the network capability of the first user service node;

send second information of the first user service node to the third network element, wherein the second information comprises one or more of the identifier of the first user service node or the address information of the first user service node; or send information about an access network device to the first user service node, wherein the information about the access network device is included in the first message, the information about the access network device comprises one or more of an identifier of the access network device or address information of the access network device, and there is a communication connection between the access network device and the first terminal device.

18. The non-transitory computer-readable storage medium according to claim 15, wherein the first message is a non-access stratum message, a registration request message, a service request message, a session establishment message, or a user service node creation request message.

19. The non-transitory computer-readable storage medium according to claim 15, wherein the instructions are executed to further cause the first network element to:

receive a second message, wherein the second message is used to update a second user service node;

update the second user service node based on the second message; and send first information of an updated second user service node to a second network element, wherein the first information comprises one or more of an identifier of the updated second user service node, address information of the updated second user service node, status information of the updated second user service node, or a network capability of the updated second user service node.

20. The non-transitory computer-readable storage medium according to claim 15, wherein the first user service node is a user service function entity or a user service logical resource.

* * * * *